Nov. 5, 1968 L. J. MEYER 3,409,118
CAM CONTROLLED ENDLESS LOOP BUCKET CONVEYOR
Filed Feb. 13, 1967 2 Sheets-Sheet 2

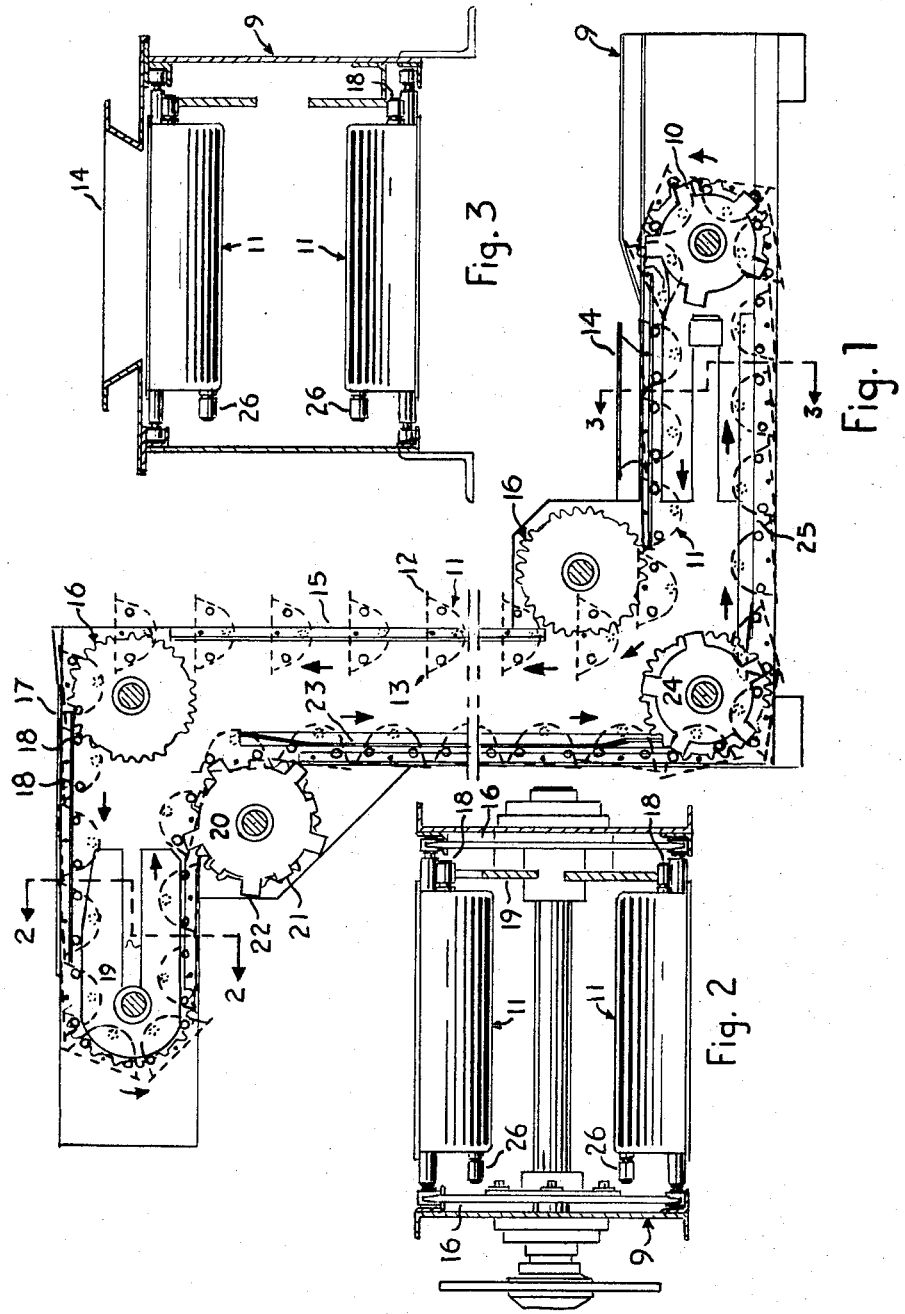

LEO J. MEYER
INVENTOR
By:
ATTORNEY

3,409,118
**CAM CONTROLLED ENDLESS LOOP
BUCKET CONVEYOR**
Leo J. Meyer, San Antonio, Tex., assignor to Meyer Machine Company, a division of Ramo, Inc., San Antonio, Tex.
Filed Feb. 13, 1967, Ser. No. 615,436
7 Claims. (Cl. 198—145)

ABSTRACT OF THE DISCLOSURE

An endless loop bucket conveyor utilizing pins with rollers projecting from the ends of the buckets. The buckets are suspended from a looped chain mounted on and driven by sprockets. Substantially circular cams are concentrically mounted on a common shaft with the sprockets. The cams engage multiple pins on the ends of the buckets thereby placing the buckets at the desired series of positions as they traverse a turn and travel an established linear course. The bucket pins and rollers are also utilized for selectively tilting and dumping the buckets.

---

This invention incorporates various improvements discovered in the course of design research undertaken to overcome certain production cost and operating difficulties in the manufacture and use of inventor's devices disclosed in his U.S. Patent No. 3,083,814 and No. 3,055,486, and other conveyors of the known art.

The conveyor bucket incorporating a trailing lip utilized in the control means is inherently expensive to construct when the buckets are fabricated by welding stainless steel. Some difficulties are also encountered in the exact control of the buckets with the elongated control lips. By eliminating the trailing lip in this improved device, production cost is reduced and increased flexibility was gained in shifting the overlapping relationships of the buckets for cleaning, loading, and dumping.

An object of this invention is to provide an improved endless loop bucket conveyor economical to produce, relatively trouble free in its operation, capable of prolonged continuous use, and of improved operating characteristics. A study of the following description by one skilled in the art will reveal further objects accomplished and improvements incorporated in the device.

This invention incorporates improved means of control of buckets pivotally suspended on a sprocket mounted and driven looped endless chain conveyor. This device may be constructed in virtually an infinite variety of configurations. The two configurations disclosed in particular detail in this specification will be in an S configuration with an end discharge as illustrated in FIG. 1 and in a C configuration illustrated in FIG. 4. The lower half of each device, including the loading station, is identical as is shown in FIGS. 1, 3, and 4.

As previously stated, this device includes a series of pivotally mounted buckets carried by an endless chain mounted on and driven by a series of sprockets. The buckets are constructed with two control pins with rollers on the far side of the device as viewed in FIGS. 1 and 4. The near side of the bucket is fabricated with a single dump pin with roller. The control pins are shown on the right of FIGS. 2 and 3 and the single dump pin on the left of FIGS. 2 and 3. The major advances in the art disclosed and claimed in this application pertain to the engagement of the two control pins by both single and multi-step cams of substantially circular configuration as the buckets negotiate the various turns in their endless looped travel. This invention will be more particularly described in the following several views and detailed description wherein like reference characters designate like or corresponding parts throughout the several views.

FIG. 1 is a side plan view in the S configuration, principally in section, partially schematic, disclosing the right or farther side of the device illustrating primarily the substantially circular control cams.

FIG. 2 is a vertical section taken on line 2—2 of FIG. 1 looking in the direction of the arrows.

FIG. 3 is a vertical section taken on line 3—3 of FIG. 1 looking in the direction of the arrows.

Figure 4:
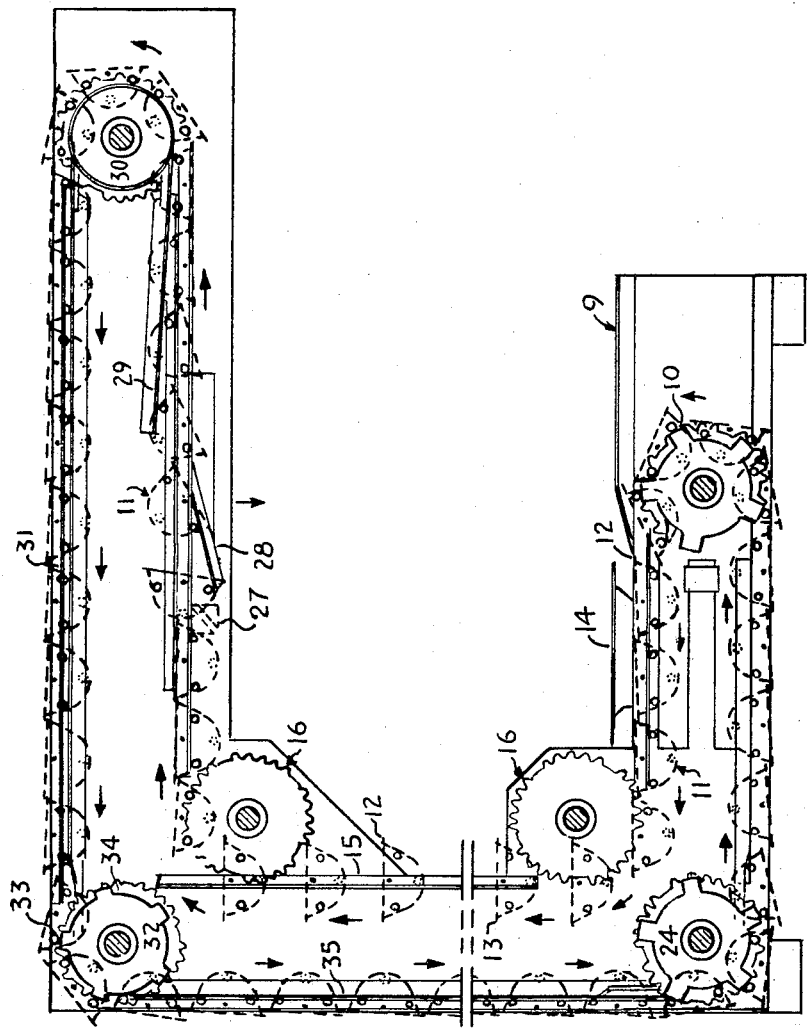
FIG. 4 is a side plan view in the C configuration, principally in section, partially schematic, of the right or farther side of the device disclosing the substantially circular control cams and a method of tilting the buckets for discharge.

This device is constructed with an outer support frame of angle iron, I beam or metal sheet as partially illustrated at 9 in the figures. This outer frame support means 9 includes mounting surfaces, brackets, and bearing means for the entire conveyor system and its drive means, which are normally electrical and are well known in the art. The mounting frame may be constructed either partially enclosed to serve primarily a support function or the structure may include mounting means and cover plates to enclose the entire system with the exception of the feed hopper opening and the discharge chutes. The design of the support structure with or without cover plates is a matter of choice depending on the functional design. The details of construction of the lower half of the device in both the S and the C configurations are substantially illustrated in FIGS. 1 and 4. The first single step control cam 10 controls the buckets 11 with trailing edge 12 overlapping the leading edge 13 of the following buckets as the continuous series approaches the loading station 14. Gravity will maintain the buckets 11 in an upright position as they move upward. To dampen oscillation, a chain guide rail 15 is provided. The chain is supported and driven by a series of sprockets 16 as the chain and buckets 11 traverse the configuration of the device.

The bucket control of the device in the S configuration is illustrated in FIG. 1. Gravity will maintain the buckets 11 in the upright position as they negotiate the 90° turn past the top sprocket. In the event the buckets 11 are tilted out of line as they complete this turn, their upper edge will contact the bucket guide rail 17 which will stabilize the buckets 11 and align their control pin rollers 18 to contact and follow the contour of the discharge cam 19; as the rollers follow the contour of this cam, the buckets 11 are inverted and their contents discharged. As the buckets 11 negotiate the inverted turn, their position is controlled by the double step cam 20. The control pin roller 18 adjacent the leading edge 13 of the bucket is contacted by the lower step 21 and the control pin roller 18 adjacent the trailing edge 12 by the upper step 22 of the cam. This tilting effect causes the leading edge 13 of the following bucket to overlap the trailing edge 12 of the preceding bucket thereby arranging them in the preferred relationship for steam or water cleaning prior to their return to the loading station 14. If the overlapping of the edges of the buckets 11 had not been rearranged by the double step cam 20, the residue of the cleaning would tend to drain through the series of buckets 11 and create an unsatisfactory operation. As the buckets 11 pass through their downward course, the control pin rollers 18 contact a vertical guide rail 23 which maintains the buckets 11 in this desired overlapping relationship as they approach and contact for control the second single step control cam 24 in the lower conveyor assembly. As the buckets 11 negotiate this lower inverted turn, the step on the cam contacts the control pin roller 18 adjacent the trailing edge 12 tilting the buckets 11 and repositions them with the trailing edge 12 overlapping the leading edge 13, the desired position for their approach to the loading station 14. The control pin rollers 18 contact a lower control rail 25 to maintain them in the desired overlapping relationship as they approach the first single step control cam 10.

The construction and operation of the device in a C configuration in its upper extremities is substantially different. The C configuration incorporates one or more bucket trip means for upending the buckets 11 for discharge. One embodiment of a fixed trip station is partially illustrated in FIG. 4. The buckets 11 are constructed with two control pins with rollers 18 just as previously described in the S embodiment. The C configuration with a bottom discharge utilizes a single dump pin with roller 26 on the opposite end of the bucket from the two control pin rollers 18 for trip control means. As the buckets 11 complete the turn after the lift portion of the route and assume a horizontal course, they approach a trip station. The dump pin and roller 26, FIGS. 2 and 3, engages a slant trip stud 27; as the bucket is upended, the control pin rollers 18 first contact the lower unloading guide rail 28 then the upper unloading guide rail 29. This controlled action discharges the contents of the buckets 11 and places the two control pin rollers 18 in proper position to contact and follow the contour of the circular cam 30. As the buckets 11 leave the circular cam 30, the control pin and roller 18 adjacent the leading edge 13 contact the upper guide rail 31, while the control pin and roller 18 adjacent the trailing edge 12 remains in contact with the circular cam 30. This track arrangement in conjunction with the fanning or spreading of the buckets 11 as they move around the circular cam 30 positions the buckets 11 with the leading edge 13 of the following bucket overlapping the trailing edge 12 of the leading bucket, which is the desired relationship to negotiate the next turn and for cleaning during the downward leg as they reverse their direction for return to the loading station 14. The control pins with rollers 18 are positioned by the upper guide rail 31 as they move laterally and approach the upper single step cam 32 where the overlapping relationship of the buckets leading edge 13 over trailing edge 12 is maintained. The control pin roller 18 adjacent the leading edge 13 is contacted by the step 33 on the cam and the control pin roller 18 adjacent the trailing edge 12 rests on the shoulder 34 of the upper single step cam 32. This maintains the bucket in a leading edge 13 overlapping trailing edge 12 relationship as the buckets 11 move downward. A downward extending vertical control track 35 contacts the control pin rollers 18, steadying and supporting the buckets 11 for steam or water cleaning if desired, as they descend to the loading level.

As previously stated, the path and control of the buckets 11 in the base section of the C model is identical with the heretofore described S configuration.

This device can be constructed in numerous configurations incorporating the principles heretofore disclosed without departing from the spirit and the scope of this invention. For example, bottom, side, end or multiple discharge stations may be utilized. Multiple loading stations may also be employed. Various adaptations will become apparent to one skilled in the art as the foregoing disclosure is studied.

While two embodiments of this invention are illustrated in the drawings and the operation described in detail, it is understood that various modifications can be made without departing from the invention set forth in the appended claims.

What I claim is:
1. A travelling bucket conveyor system comprising:
   (a) a mounting frame,
   (b) bearing means secured to said frame,
   (c) shafts rotatably mounted in said bearing means,
   (d) sprockets capable of receiving and supporting a link chain fixedly mounted on said shafts,
   (e) a link chain looped around said sprockets,
   (f) buckets having an open top and an enclosed bottom tiltedly suspended from the said chain,
   (g) two control pins fixedly attached to said buckets on a line substantially parallel with top of said buckets, and
   (h) a substantially circular control cam mounted on said shaft, said control cam having evenly spaced steps at two varying radii from the center of rotation of said cam, said steps contacting said control pins thereby imparting a uniform tilt to said buckets as they pass said cam.
2. The invention of claim 1 wherein the said system includes multiple control cams with multiple steps at least one of said steps on one of said cams consistently at a different radius from its center of rotation than the corresponding step of the other said cam.
3. A travelling bucket conveyor system comprising:
   (a) rotatable sprocket means capable of receiving and supporting a link chain,
   (b) a link chain looped around said sprocket means,
   (c) buckets tiltably suspended from said chain,
   (d) multiple control pins fixedly attached to said buckets,
   (e) rotatable control cam means having evenly spaced steps at two varying radii from the center of rotation of said controlled cam means, said steps contacting said control pins, thereby imparting a controlled tilt to said buckets as they pass said cam.
4. The invention of claim 3 wherein said multiple controlled pins protrude from one end of said buckets on a line substantially parallel to the top of said buckets.
5. The invention of claim 3 wherein the said multiple control pins comprise control pin rollers.
6. The invention of claim 3 wherein the said sprocket means and the said control cam means have a common axis of rotation and are spaced parallel.
7. A travelling bucket conveyor system comprising:
   (a) a mounting frame,
   (b) bearing means secured to said frame,
   (c) shafts rotatably mounted in said bearing means,
   (d) sprockets capable of receiving and supporting a link chain fixedly mounted on said shafts,
   (e) a link chain looped around said sprockets,
   (f) buckets having a top and bottom tiltably suspended from said chain,
   (g) two control pins fixedly attached to said buckets,
   (h) a control cam mounted on said shaft, said control cam having evenly spaced steps at two varying radii from its center of rotation, said steps contacting said control pins thereby controlling said buckets as they pass said cam.

References Cited

UNITED STATES PATENTS 3,055,486   9/1962   Meyer _____ 198—145

OTHER REFERENCES

German allowed application No. 1,108,138, Sommer, published May 31, 1961.

EVON C. BLUNK, *Primary Examiner.*

M. L. AJEMAN, *Assistant Examiner.*